July 12, 1938. J. MORKOVSKI 2,123,555
IMPLEMENT ATTACHMENT FOR TRACTORS
Filed April 10, 1935 2 Sheets-Sheet 1

Inventor
James Morkovski
By ...... Atty.

July 12, 1938.  J. MORKOVSKI  2,123,555

IMPLEMENT ATTACHMENT FOR TRACTORS

Filed April 10, 1935   2 Sheets-Sheet 2

Inventor
James Morkovski
By V. F. Lassagne
Atty.

Patented July 12, 1938

2,123,555

UNITED STATES PATENT OFFICE 2,123,555

IMPLEMENT ATTACHMENT FOR TRACTORS

James Morkovski, Canton, Ill., assignor to International Harvester Company, a corporation of New Jersey Application April 10, 1935, Serial No. 15,551

10 Claims. (Cl. 97—50)

This invention relates to implement attachments for tractors and more specifically to a spring pressure device for a cane cultivator directly connected to a tractor.

The main object of the invention is to provide a cane cultivator attachment for a tractor of the general purpose type.

Another object is to provide a rearwardly extending boom structure for supporting the cane cultivator frame.

Another object is to provide a mechanism for applying a uniform pressure to the ground working tools.

Still another object of my invention is to adapt it to a tractor of the general purpose type.

Still another object of my invention is to provide adjustable disc gangs which may be adjusted for inthrow and out-throw working of the soil, and also adjustable laterally for the correct working of the soil of the cane beds.

Another object of my invention is to adapt this cane cultivator to tractors equipped with high wheels.

Another object of my invention is to provide a power lift mechanism operated from the tractor engine to raise and lower the implement frame structure.

Still another object of my invention is to provide structure for counter-balancing the implement frame structure in the raising and lowering of the implement frame.

Other objects and advantages will appear in the following description of a preferred embodiment of the invention, as illustrated in the accompanying drawings, wherein.

Figure 1:
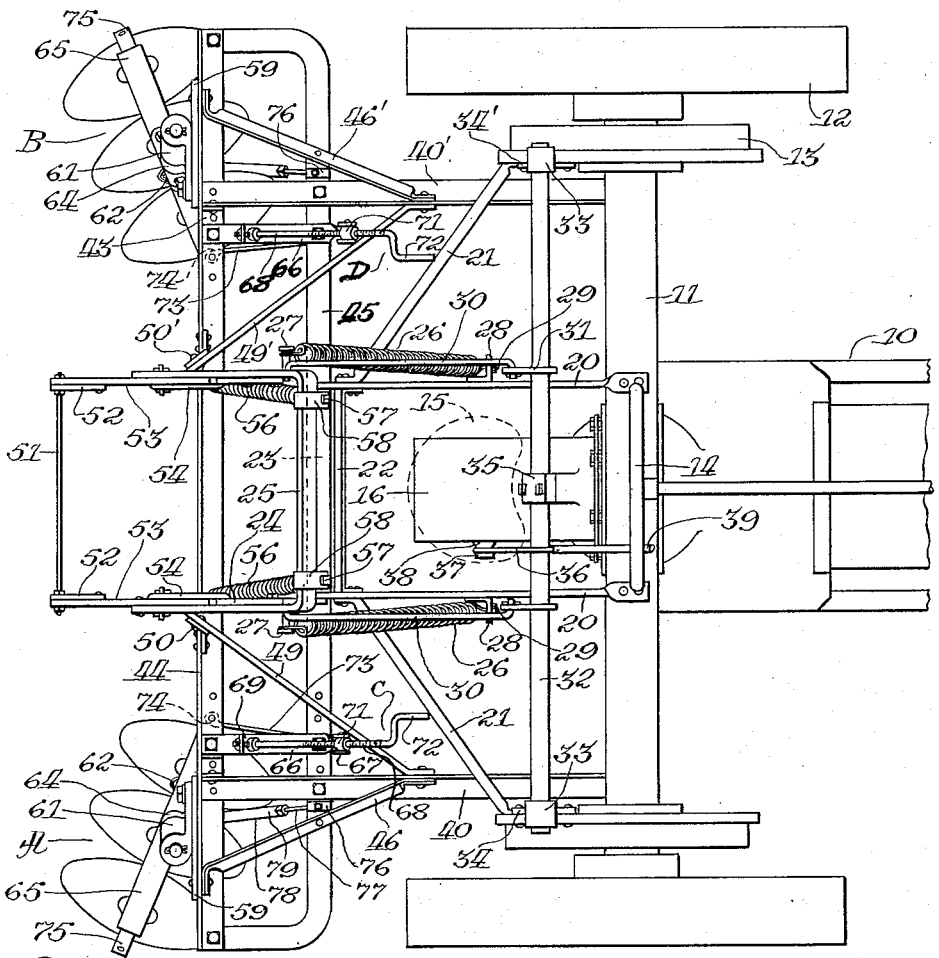
Figure 1 is a plan view of the rear portion of a tractor with the cane cultivator attached.

The invention is herein disclosed in combination with a tractor comprising longitudinal frame members 10 connected at their rear ends to a transverse axle housing 11 containing differentially driven shafts, which drive each of the traction wheels 12 through gearing in depending housings 13. The type of tractor is best disclosed in the United States Patent No. 1,613,865 to J. E. Anthony et al. granted January 11, 1927, and filed November 15, 1923. The patent discloses a tricycle type of tractor, but it is to be understood that the tricycle type of steering truck may be replaced with a forecarriage of the automobile type with the front axle rigid, the front wheels being mounted on steering knuckles. It is with the later type of tractor that the preferred embodiment of my invention is to be disclosed. The forecarriage has not been disclosed, as it is not necessary to the complete understanding of my invention. The tractor is steered through a steering wheel 14 adjacent an operator's station 15. Attached to the rear axle housing 11 at its mid-portion is a power lift attachment 16 similar to that disclosed in the United States Patent No. 1,911,373 to Alexus C. Lindgren, granted May 30, 1933, and filed May 26, 1931.

This power lift attachment 16 is of the one-half revolution type clutch and is driven from the engine of the tractor through a power take-off shaft 17, through suitable slip shafts and universal joints 18. The power lift attachment may be provided with an extension power take-off shaft 19 forming the first unit of the power take-off mechanism which has a shaft constantly driven from the engine for transmitting rotary power to an implement. It is to be also understood that other types of power lift attachments may be used.

Figures 1, 2, 3 and 4 show the construction of the super-structure for supporting the can cultivator and the construction of the frame work for mounting the tillage tools. The super-structure, in the nature of a rearwardly extending boom, comprises upwardly and rearwardly inclined boom members 20 laterally spaced and secured to the transverse axle housing 11. The boom members 20 forming an elongated support are braced by upwardly and rearwardly inclined boom braces 21 secured at their lower ends to the depending housings 13, and at their upper ends, to the boom members 20, which are laterally spaced at their upper ends by a boom spreader brace 22. Pivotally mounted in the upper ends of the boom members 20 is a lifting rockshaft 23, which has laterally secured thereto a lifting plate member 24. Attached to the lifting plate members is a U-shaped lifting bail 25 which may be considered as having to and fro movement in a vertical plane, with the legs of the bail extending rearwardly. Eccentric to the rockshaft and connected to the lifting bail 25 are counter-balancing springs 26 pivotally connected at their upper ends to studs 27 secured to the lifting bail 25 midway between a line perpendicular from the center of the rockshaft to the plane of the lifting bail, and base of the lifting bail. The counter-balancing springs 26 are adjustably connected to brackets 28 secured to the boom members 20 by adjusting bolts and nuts 29.

The power lift attachment 16 is operatively connected to reciprocate in a to and fro movement the lifting bail 25 which forms with the plate members 24 a reciprocating or oscillating means. Lifting links 30 are pivotally and eccentrically connected at their upper ends to the lifting bail 25, and they are also pivotally connected at their lower ends to lifting arms 31 secured to a power lift rockshaft 32 and laterally spaced thereon. The rockshaft 32 is rotatably mounted in bearings 33 mounted in right and left hand rockshaft supporting brackets 34 and 34'. The center of the rockshaft is also rotatably supported to give more rigidity to the rockshaft by a center bearing 35 secured to the power lift attachment casing 16. A rockshaft arm 36, which is secured to the rockshaft 32 is pivotally connected to a pitman strap 37 at its upper end. The pitman strap 37 is connected at its lower end to a lifting lever 38, which is operatively connected to the power lift clutch of the one-half revolution type, or other power lift modifications which need not be described for the understanding of my invention forming the second unit having an intermittently operable reciprocable member. The power lift attachment 16 is operated by a handle 39 extending within reach of the operator's station 15, and, through the mechanism previously set forth, the lifting bail 25 is reciprocated or oscillated to its raised or lowered position, intermittently at the desire of the operator. The power take-off shaft 19 may be run continuously at the same time as the lifting mechanism is operating. A lever, not shown, may be operated to throw the power take-off shaft 17 into and out of gear with the tractor engine.

The implement frame of the cane cultivator, to which the tillage tools are attached, comprises rearwardly extending right and left frame side angles 40 and 40', respectively, secured to drawbar hinges 41, which are pivotally attached to a stub draft connection 42, firmly attached to the depending housings 13. Secured to the rear ends of the frame side angles by angle brackets 43 is a rear cross angle 44 extending laterally the width of the tractor. A bow-shaped front frame angle 45 is secured to the rear cross angle 44 at the ends thereof and also to the frame side angles 40 and 40', where they cross the front frame angle. This construction forms a very rigid frame. Additional bracing is secured by right and left cross angle braces 46 and 46', which are secured at their front ends to the frame side angles, at their mid-portion, to the front cross angle, and, at their rear portions, to the rear cross angle. A rear crossbar 47 is spaced underneath the rear cross angle 44 to form an adjusting slot. The rear crossbar 47 is spaced from the rear cross angle 44 at its ends by the rear portions of the front bow-shaped cross angle 45, being flattened out. Additional spacers 48 may also be laterally spaced between the rear cross angle 44 and the rear crossbar 47, to give rigidity thereto. Right and left lift arms 49 and 49', respectively, are secured at their front ends to the right and left frame side angles 40 and 40' and are inwardly inclined from the frame side angles, and upwardly and rearwardly inclined over the rear cross angle 44, to the rear thereof. Right and left lift arm braces 50 and 50' secure the lift arms 49 and 49' to the rear cross angle 44. Pivotally connected to a lift arm tie-rod 51 are pressure bars 52. The pressure bars 52 at their upper ends are provided with a plurality of holes, as shown. With tractors which are equipped with the so-called high wheels, which are 66 inches in diameter, the upper and middle holes of the pressure bars 52 are connected to bell cranks 53; and, with tractors equipped with low wheels, the lower holes of the pressure bars are connected to the bell cranks 53. The bell cranks 53 form additional reciprocating or oscillating means mounted on the reciprocating or oscillating means 25 and are pivoted between bell crank straps 54 formed to support the bell cranks laterally and the legs of the lifting bail 25 to which the bell crank straps are secured. The bell cranks 53 may be regarded as having to and fro movement in vertical planes. The rearwardly extending portions of the bell cranks 53 may be also provided with a plurality of adjusting holes for pivotally connecting the pressure bars 52 to vary the amount of pressure on the implement frame. The downwardly extending portions of the bell cranks 53 are also provided with a plurality of adjusting holes, to which are pivotally connected links 55. Pressure springs 56, at their lower ends, are connected to the links 55, and, at their upper ends, the pressure springs 56 are pivoted to adjusting eye-bolts 57. The bell cranks 53 with the pressure springs 56 and their attaching parts form pressure means which are mounted on the reciprocating or oscillating means 25. The adjusting eye-bolts are adjustably mounted on pressure spring anchors 58 secured to the base of the U-shaped lifting bail 25.

Figure 4:
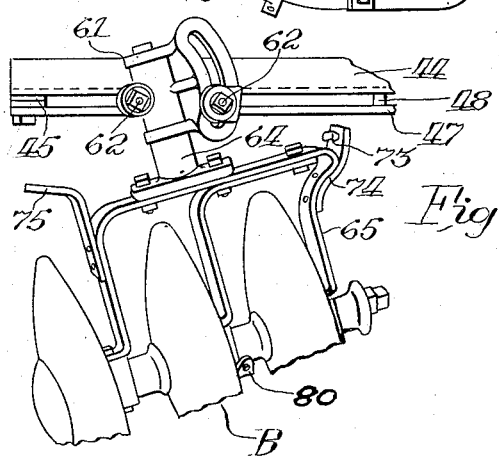
Figure 4 is a partial view of the rear elevation of the cane cultivator without the high frame extension plate to show how the disc gangs are adjusted; and, Figure 5 shows the high frame extension plate.
Figure 5:
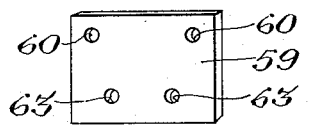

The right and left disc gangs A and B are of the usual construction of arbor bolts, bearing brackets, bearings, etc., and they need not be described in detail. Cut-away discs may also be used wherever conditions are such as to require their use. The disc gangs may be used for in-throw cultivation, (the position indicated in the drawings, as best shown in Figures 1 and 4), or out-throw cultivation. The disc gangs A and B are secured to the implement frame by extension plates 59, best shown in Figures 2, 3 and 5, and adjustably mounted in the adjusting slot provided between the rear frame angle 44 and the rear crossbar 47, best shown in Figure 4. Bolts inserted through holes 60 secure the extension plates 59 to the implement frame. Pivot castings 61 are adjustably secured by bolts 62 inserted through lower holes 63 in the extension plates 59, and the holes and adjusting slots in pivot castings 61. Any angular adjustment in a vertical plane may be secured by means of the arcuate serrated slot in the pivot casting 61 and the serrated washer, which locks the casting in adjusted position. Disc gangs A and B are pivoted in the pivot casting 61 by a disc gang head 64, which is secured to yoke standards 65. The disc gangs, as before mentioned, may be reversed from in-throw to out-throw cultivation by pivoting the disc gangs 180 degrees in the pivot casting 61, and adjusting the pivot casting 60, so that the serrated slot is lowered to the position shown in Figure 4. When the cane cultivator is used with low wheels, no extension plates are needed and the disc gangs A and B are supported from the implement frame, as shown in Figure 4. The disc gang adjusting assemblies C and D comprise an adjusting screw bracket support 66 adjustably supported on the front and rear frame angles 44 and 45, respectively, which have a plurality of laterally spaced holes, so that the complete adjusting assemblies C and D may be adjusted laterally at the will of the operator. The bracket support 66 at its forward portion extends upwardly, and an adjusting screw arm 67 is pivoted thereon. An adjusting screw 68 is rotatably supported at the rear in a bracket 69 secured to the bracket support 66. Longitudinal displacement of the adjusting screw 68 is prevented by stop collars 70 secured to the adjusting screw 68 and placed on each side of the bracket 69. The forward portion of the adjusting screw 68 is threaded and an adjusting screw swivel 71 is threaded thereon and pivotally mounted in the upper end of the adjusting screw arm 67. An adjusting screw handle 72 is pivotally secured to the front end of the adjusting screw 68. Adjusting rods 73 are pivotally hooked in disc arms 74 when the disc gangs A and B are used for in-throw cultivation and in disc arms 75 when the disc gangs A and B are turned through an angle of 180 degrees for out-throw cultivation. The forward ends of the adjusting rods 73 are pivotally connected to the lower ends of the adjusting screw arms 67. Draft rod supports 76 are connected to the front frame angle 25 between the frame side angles 40 and 40', and the side angle braces 46 and 46'. An upper end 77 of an adjustable draft rod 78 is swivelly connected to the draft rod support 76, and a lower end 79 is pivotally connected to a draft rod bracket 80, best shown in Figure 4, which shows the hole in which the draft rod 78 is connected when the disc gangs A and B are used for out-throw cultivation. The upper end 77 of the draft rod 78 is adjustable in the lower end 79 of the draft rod 78 in order to adjust the length of the draft rod 78 when the cane cultivator attachment is used with a tractor having high or low wheels. The draft rod supports 76 may be adjusted laterally in the front frame angle 25 as the disc gangs A and B are moved in or out laterally in the cultivation of the ground.

Figure 2:
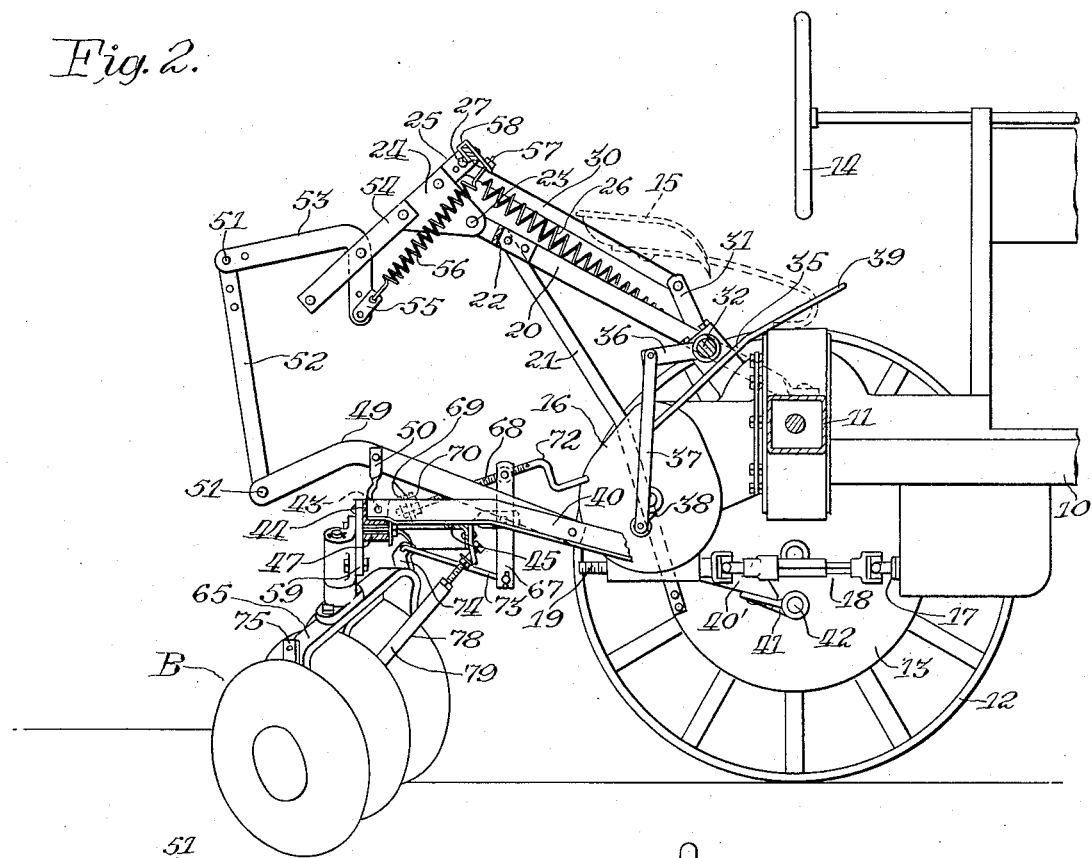
Figure 2 is a side elevation of the rear portion of the tractor with the right wheel removed, showing the cane cultivator in place in working position.
Figure 3:
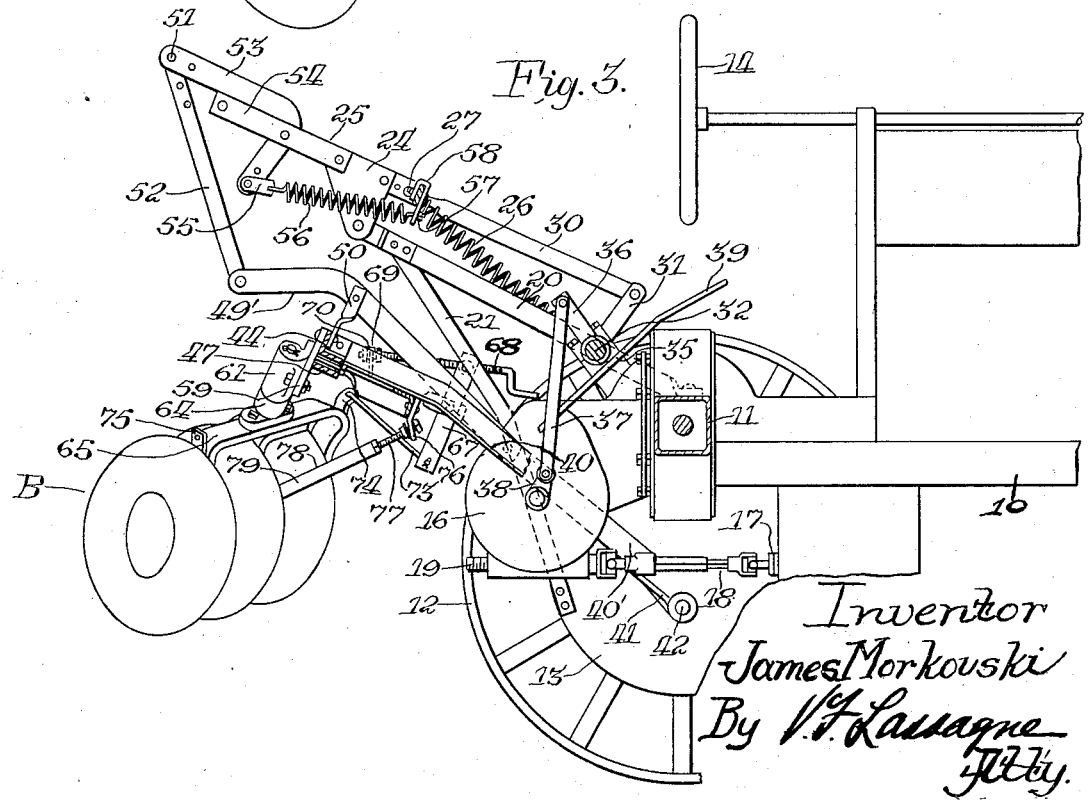
Figure 3 is a side elevation of the rear portion of the tractor with the right wheel removed, showing the cane cultivator in position for transporting.

In the operation of the cane cultivator attachment, the operator sets his disc gangs as shown in Figures 1 and 2 and as previously described. If he wishes to build up the cane beds, they are set as shown in Figure 4 for in-throw cultivation; but, if he wishes to cut away the cane bed to aerate the soil and cane roots, the gangs A and B are reversed 180 degrees from that shown in Figure 4 for out-throw cultivation, as previously described. The disc gangs A and B may be adjusted laterally in either direction, depending on whether the cane beds are being built up or cut away. The cut of the discs is adjusted by the handles 72 of the adjusting screw assemblies C and D. In transporting the cane cultivator, the operator trips the lever 39 of the power lift 16, and, with the motor running and the power lift shaft 18 having been put in motion, the cane attachment is either raised or lowered, and, in this preferred embodiment, the raising and lowering is accomplished in one-half revolution of the clutch. On completion of its cycle, the implement is locked in its raised or lowered position. The counter-balancing springs 26 may be adjusted to counter-balance the weight of the implement frame, and, in so doing, lightens the load on the power lift. The operator may also adjust the tension of the pressure springs 56, and various pressures may be obtained on the ground engaging tools because of the plurality of adjustments which may be had on the bell cranks 53. As the pressure bars 52 are attached to the lift arms 49 and 49' so that the implement frame lies between the connection of these members and the draft connection of the implement frame, it is obvious that any pressure exerted on the pressure bars is multiplied as to its effect on the implement tools mounted on the implement frame, and also the effective lifting force necessary to raise the implement frame to transport position is reduced. The parts of the spring pressure attachment are so proportioned that the product of the perpendicular distance from pivot point of bell crank 53 to the line of force through the pressure springs 56 and the force exerted by springs 56 is essentially the same for every position of arms 53. This being true, the ground pressure exerted by the pressure spring is always uniform for any position of the implement frame. Whenever any obstruction is encountered by the ground engaging tools, the pressure springs 56 are stretched and then act as relief springs to absorb any shocks to the implement frame. After the obstruction has been passed over, the implement frame returns to its original position and has the same spring pressure exerted thereon. The weight of the cane cultivator attachment at the rear is so great that it is sometimes necessary to weight the front end of the tractor down by adding weights to the front tractor wheels or by attaching a large weight to supporting members attached to the side frames 10 at the front of the tractor. Sometimes it is necessary to provide side angle extensions when the high wheels are used. These are attached between the frame side angles 40 and 40' and the tractor drawbar hinges 41. The effect of these side frame extensions is to lengthen the frame side angles 40 and 40' and to extend the frame rearwardly from the rear wheels. In addition, more weight is sometimes needed at the front end of the tractor to overcome the additional turning moment caused by extending the implement frame rearwardly. The tractor straddles the cane row to be cultivated and the automobile type of steering truck is used, although the tricycle type of steering truck could also be used. In using the two wheeled automobile type of steering truck, additional stability is given to the tractor and the attached implement. When high rear wheels are used, extensions must also be provided for the front steering truck to keep the tractor frame level.

From the preceding description, it is evident that there has been provided an attachment which may be readily connected to and disconnected from the tractor for subsequent attaching of other tractor mounted implement attachments. Furthermore, a cane cultivator attachment has been provided for a tractor of the general purpose type which will meet all the requirements of cane cultivation.

It is to be understood that materials suitable for the stresses encountered in an attachment of this description are to be used. The preferred embodiment of the invention herein described is capable of certain modifications without departure from the scope of the invention to be defined in the following claims.

What is claimed is:

1. The combination with a tractor having a draft connection and a power lift attachment operated from said tractor, of a tractor drawn implement comprising a boom structure supported from said tractor, means mounted on the aforesaid boom structure for to and fro movement in a vertical plane for lifting and lowering said implement, means for connecting said first mentioned means to the power lift attachment, additional means mounted on the first mentioned means for to and fro movement in a vertical plane for exerting pressure on said implement, an implement frame pivoted to said tractor draft connection, and means for connecting said implement frame to the third mentioned means whereby said implement frame may be raised and lowered.

2. The combination with a tractor having a draft connection and a power lift attachment operated from said tractor, of a tractor drawn implement comprising a boom structure supported from said tractor, means mounted on the aforesaid boom structure for to and fro movement in a vertical plane for lifting and lowering said implement, means for connecting said first mentioned means to the power lift attachment, additional means mounted on the first mentioned means for to and fro movement in a vertical plane for exerting pressure on said implement, an implement frame pivoted to said tractor draft connection, earth working tools mounted thereon, means for connecting said implement frame to the third mentioned means whereby said implement frame may be raised and lowered, and means connected to said third mentioned means whereby pressure may be applied to the aforesaid earth working tools.

3. The combination with a tractor having a draft connection and a power lift attachment operated from said tractor, of a tractor drawn implement comprising a boom structure supported from said tractor, means mounted on the aforesaid boom structure for to and fro movement in a vertical plane for lifting and lowering said implement, means for connecting said first mentioned means to the power lift attachment, an implement frame pivoted to said tractor draft connection, earth working tools mounted thereon, means mounted for to and fro movement in a vertical plane on said first mentioned means for exerting pressure on said earth working tools, and means for connecting said implement frame to the aforesaid first mentioned means whereby said implement frame may be raised and lowered.

4. The combination with a tractor having a draft connection and a power lift attachment operated from said tractor, of a tractor drawn implement comprising a boom structure supported from said tractor, means mounted on the aforesaid boom structure for to and fro movement in a vertical plane for lifting and lowering said implement, means for connecting said first mentioned means to the power lift attachment, additional means mounted on the first mentioned means for to and fro movement in a vertical plane for exerting pressure on said implement, an implement frame pivoted to said tractor draft connection, earth working tools mounted thereon, means for connecting said implement frame to the third mentioned means whereby said implement frame may be raised and lowered, and resilient means connected to said third mentioned means whereby pressure may be applied to the aforesaid earth working tools, said resilient means acting also as a safety release.

5. The combination with a tractor having a draft connection and a power lift attachment operated from said tractor, of a tractor drawn implement comprising a boom structure supported from said tractor, means mounted on the aforesaid boom structure for to and fro movement in a vertical plane for raising and lowering said implement, means for connecting said first mentioned means to the power lift attachment, an implement frame pivoted to said tractor draft connection, pressure means mounted for to and fro movement in a vertical plane on said first mentioned means for applying pressure to said implement frame, means for connecting said pressure means to said implement frame, earth working tools mounted on said implement frame, means for adjusting said earth working tools laterally, means for adjusting said earth working tools angularly in a vertical plane, means for adjusting said earth working tools angularly in a horizontal plane, and means for throwing said power lift attachment into and out of operation whereby said implement frame may be raised and lowered.

6. The combination with a tractor having a draft connection and a power lift attachment operated from said tractor, of a tractor drawn implement comprising a boom structure in the form of an elongated support supported from said tractor, oscillating means mounted on the aforesaid boom structure for lifting and lowering said implement, means for connecting said oscillating means to the power lift attachment, an implement frame pivoted to said tractor draft connection, pressure means mounted for to and fro movement in a vertical plane on said oscillating means for applying pressure to said implement frame, means for connecting said pressure means to said implement frame, earth working tools mounted on said implement frame, means for adjusting said earth working tools, and means for throwing said power lift attachment into and out of operation whereby said implement frame may be raised and lowered.

7. The combination with a tractor having a draft connection and a power lift attachment operated from said tractor, of a tractor drawn implement comprising a boom structure in the form of an elongated support supported from said tractor, oscillating means mounted on the aforesaid boom structure for lifting and lowering said implement, means for connecting said oscillating means to the power lift attachment, an implement frame pivoted to said tractor draft connection, pressure means mounted for oscillating movement on said oscillating means for applying pressure to said implement frame, means for connecting said pressure means to said implement frame, earth working tools mounted on said implement frame, means for adjusting said earth working tools laterally, means for adjusting said earth working tools angularly in a vertical plane, means for adjusting said earth working tools angularly in a horizontal plane, and means for throwing said power lift attachment into and out of operation whereby said implement frame may be raised and lowered.

8. The combination with a tractor having a draft connection and a power lift attachment operated from said tractor, of a tractor drawn implement comprising a boom structure supported from said tractor, means mounted on the aforesaid boom structure for to and fro movement in a vertical plane for lifting and lowering said implement, means for connecting said first mentioned means to the power lift attachment, additional means mounted on the first mentioned means for to and fro movement in a vertical plane for exerting pressure on said implement, an implement frame pivoted to said tractor draft connection, means for connecting said implement frame to the third mentioned means, resilient means connected to said third mentioned means whereby pressure may be exerted on said implement frame through said intervening connecting means, earth working tools mounted on said implement frame, means for adjusting said earth working tools, and means for throwing said power lift attachment into and out of operation whereby said implement frame may be raised and lowered.

9. The combination with a tractor having a draft connection and a power lift attachment operated from said tractor, of a tractor drawn implement comprising a boom structure supported from said tractor, oscillating means mounted on the aforesaid boom structure for lifting and lowering said implement, means for connecting said oscillating means to the power lift attachment, additional oscillating means for exerting pressure on said implement mounted on the first mentioned oscillating means, an implement frame pivoted to said tractor draft connection, means for connecting said implement frame to the last mentioned oscillating means, resilient means connected to said last mentioned oscillating means whereby pressure may be exerted on said intervening connecting means, earth working tools mounted on said implement frame, means for adjusting said earth working tools, and means for throwing said power lift attachment into and out of operation whereby said implement frame may be raised and lowered.

10. The combination with a tractor having a draft connection and a power lift attachment operated from said tractor, of a tractor drawn implement comprising a boom structure supported from said tractor, oscillating means mounted on the aforesaid boom structure for lifting and lowering said implement, intermediate oscillating means between said power lift attachment and said oscillating means on said boom structure, means connecting said power lift attachment to said intermediate oscillating means, means connecting said intermediate oscillating means to said oscillating means on said boom structure, an implement frame pivoted to said tractor draft connection, resilient means mounted on said first mentioned oscillating means for applying pressure to said implement frame, means for connecting said resilient means to said implement frame, counter-balancing means connected to said first mentioned oscillating means for counter-balancing said implement frame, and means for throwing said power lift attachment into and out of operation whereby said implement frame may be raised and lowered alternately.

JAMES MORKOVSKI.